United States Patent [19]
Suzuki

[11] Patent Number: 5,187,732
[45] Date of Patent: Feb. 16, 1993

[54] BOARD-TO-BOARD TEST UNIT FOR A DIGITAL SUBSCRIBER LINE

[75] Inventor: Masayoshi Suzuki, Kawasaki, Japan

[73] Assignee: Fujitsu Limited, Tokyo, Japan

[21] Appl. No.: 756,412

[22] Filed: Sep. 9, 1991

[30] Foreign Application Priority Data

Sep. 10, 1990 [JP] Japan .................................. 2-240465

[51] Int. Cl.$^5$ .............................................. H04M 3/30
[52] U.S. Cl. .......................................... 379/5; 379/18; 379/15
[58] Field of Search ...................... 379/5, 6, 9, 10, 15, 379/16, 17, 18, 21, 27, 28, 29

[56] References Cited
U.S. PATENT DOCUMENTS 3,920,927 11/1975 De Luca .................................. 379/15
4,860,281 8/1989 Finley et al. ........................ 379/5 X Primary Examiner—Stafford D. Schreyer

[57] ABSTRACT

An upstream PCM link accommodated in a new switch is bridged to a downstream PCM link accommodated in an old switch in the normal operating condition. A test unit sends the number of a subscriber to be tested to an old and new switches. The old switch sends call control information corresponding to the directory number of a subscriber to be tested as a normal call process. A test call control information monitor in the new switch monitors whether or not the call control information is properly received through a call control information extractor provided in the new switch as a standard component. Thus, a board-to-board test can be conducted by combining a normal call function in the old switch and a standard call control information extracting function of the new switch with a plurality of subscriber signals multiplexed in physical links in the PCM link without excessively increasing a load of the switch.

13 Claims, 11 Drawing Sheets

| CHANNEL FRAME TIME SLOT | LOGICAL NUMBERS OF SUBSCRIBER | | | |
|---|---|---|---|---|
| | LINK A | LINK B | LINK C | LINK D |
| 1 | 1 | 25 | 49 | 73 |
| 2 | 13 | 37 | 61 | 85 |
| 3 | 2 | 26 | 50 | 74 |
| 4 | 14 | 38 | 62 | 86 |
| 5 | 3 | 27 | 51 | 75 |
| 6 | 15 | 39 | 63 | 87 |
| 7 | 4 | 28 | 52 | 76 |
| 8 | 16 | 40 | 64 | 88 |
| 9 | 5 | 29 | 53 | 77 |
| 10 | 17 | 41 | 65 | 89 |
| 11 | 6 | 30 | 54 | 78 |
| 12 | 18 | 42 | 66 | 90 |
| 13 | 7 | 31 | 55 | 79 |
| 14 | 19 | 43 | 67 | 91 |
| 15 | 8 | 32 | 56 | 80 |
| 16 | 20 | 44 | 68 | 92 |
| 17 | 9 | 33 | 57 | 81 |
| 18 | 21 | 45 | 69 | 93 |
| 19 | 10 | 34 | 58 | 82 |
| 20 | 22 | 46 | 70 | 94 |
| 21 | 11 | 35 | 59 | 83 |
| 22 | 23 | 47 | 71 | 95 |
| 23 | 12 | 36 | 60 | 84 |
| 24 | 24 | 48 | 72 | 96 |

FIG. 6

| CHANNEL UNIT TYPE | STATION CONDITION TO CHANNEL UNIT | BILLS RECEIVED FROM THE DIGITAL INTERFACE | |
|---|---|---|---|
| | | A | B |
| SINGLE PARRLY | ON-HOOK | 0 | 0 |
| | OFF-HOOK | 1 | 0 |
| | UNEQUIPPED | 1 | 1 |
| SUPERIMPOSED RINGING MULTIPARTY (SPR-MP) | ON-HOOK | 0 | 0 |
| | TIP PARTY GROUND | 0 | 1 |
| | OFF-HOOK | 1 | 0 |
| | UNEQUIPPED | 1 | 1 |
| FREQUENCY SELECTIVE RINGING MULTIPARTY (FSR-MP) | ON-HOOK | 0 | 0 |
| | OFF-HOOK | 1 | 0 |
| | UNEQUIPPED | 1 | 1 |
| COIN | ON-HOOK | 0 | 0 |
| | COIN GROUND | 0 | 1 |
| | OFF-HOOK | 1 | 0 |
| | UNEQUIPPED | 1 | 1 |
| GROUND START | ON-HOOK | 0 | 0 |
| | RING GROUND | 0 | 1 |
| | OFF-HOOK | 1 | 0 |
| | UNEQUIPPED | 1 | 1 |

FIG. 7

LOGICAL NUMBER OF A SUBSCRIBER AT AN RT

| LINE NO. USED IN C-FIED MESSAGES | LINK A | LINK C |
|---|---|---|
| 0 | 1 | 49 |
| 1 | 25 | 73 |
| 2 | 13 | 61 |
| 3 | 37 | 85 |
| 4 | 2 | 50 |
| 5 | 26 | 74 |
| 6 | 14 | 62 |
| 7 | 38 | 86 |
| 8 | 3 | 51 |
| 9 | 27 | 75 |
| 10 | 15 | 63 |
| 11 | 39 | 87 |
| 12 | 4 | 52 |
| 13 | 28 | 76 |
| 14 | 16 | 64 |
| 15 | 40 | 88 |
| 16 | 5 | 53 |
| 17 | 29 | 77 |
| 18 | 17 | 65 |
| 19 | 41 | 89 |
| 20 | 6 | 51 |
| 21 | 30 | 78 |
| 22 | 18 | 66 |
| 23 | 42 | 90 |
| 24 | 7 | 55 |
| 25 | 31 | 79 |
| 26 | 19 | 67 |
| 27 | 43 | 91 |
| 28 | 8 | 56 |
| 29 | 32 | 80 |
| 30 | 20 | 68 |
| 31 | 44 | 92 |
| 32 | 9 | 57 |
| 33 | 33 | 81 |
| 34 | 21 | 60 |
| 35 | 45 | 93 |
| 36 | 10 | 58 |
| 37 | 34 | 82 |
| 38 | 22 | 70 |
| 39 | 46 | 93 |
| 40 | 11 | 59 |
| 41 | 35 | 83 |
| 42 | 23 | 71 |
| 43 | 47 | 95 |
| 44 | 12 | 60 |
| 45 | 36 | 84 |
| 46 | 24 | 72 |
| 47 | 48 | 96 |

FIG. 8

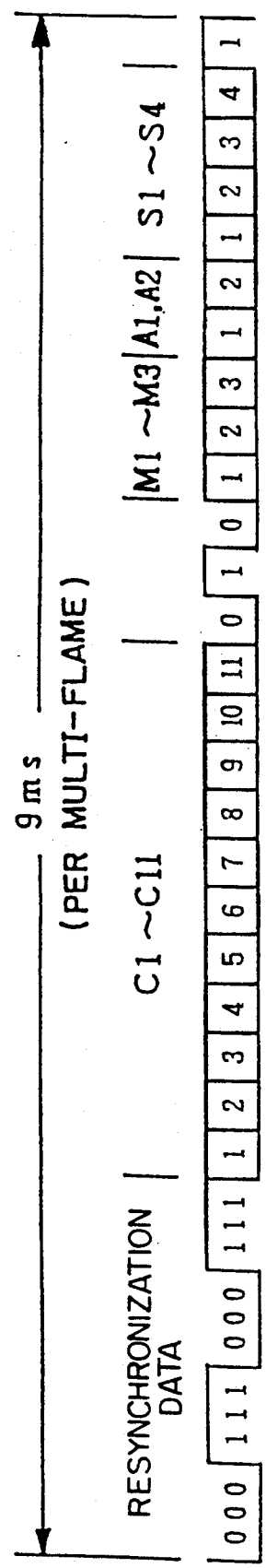

| LINE GROUND | C4 | C5 | C6 | C7 | C8 | C9 | C10 | C11 |
|---|---|---|---|---|---|---|---|---|
| 1 | 2 | 3 | 4 | 5 | 6 | 7 | 8 | 9 |
| 2 | 10 | 11 | 12 | 13 | 14 | 15 | 16 | 17 |
| 3 | 18 | 19 | 20 | 21 | 22 | 23 | 24 | 25 |
| 4 | 26 | 27 | 28 | 29 | 30 | 31 | 32 | 33 |
| 5 | 34 | 35 | 36 | 37 | 38 | 39 | 40 | 41 |
| 6 | 42 | 43 | 44 | 45 | 46 | 47 | 0 | 1 |

FIG. 9C

BOARD-TO-BOARD TEST UNIT FOR A DIGITAL SUBSCRIBER LINE

BACKGROUND OF THE INVENTION

1. Field of the Invention

The present invention relates to a board-to-board test unit for testing the consistency of subscriber data and cabling (allocation of a time slot) while bridging a new and an old switches prior to replacement of an old switch with a new switch so that the replacement can be instantaneously completed without disturbing services to the subscriber.

2. Description of the Related Art

With the development of advanced switches in the telephone switching network, etc., an old switch often has to be replaced with a new switch.

In this case, however, the replacement must be conducted instantaneously without disturbing services to subscribers accommodated in the old switch. Therefore, a test must be conducted with the old switch operated in the normal operating condition when the consistency test of the new switch on subscriber data and time slot allocation is conducted prior to the replacement.

The test described above is commonly called "a board-to-board test" because a board-to-board test loop is configured through both the old and new switches. FIG. 1 shows an example of a board-to-board test of the prior art technology.

Prior to the replacement, an analog subscriber line 102 assigned to an analog subscriber 101 (telephone, facsimile, etc.) is accommodated in a subscriber card (subscriber circuit) 104 of an old switch 105 through a main distribution frame (MDF) 103. The following board-to-board test is conducted before the replacement of the old switch 105 with a new switch 106 is performed in the above described way.

In the MDF103, in addition to the connection between the analog subscriber line 102 (shown in broken line A in FIG. 1) and the old switch 105, a bridge (shown in broken line B) is provided between the analog subscriber line 102 and a subscriber card 107, which is assigned for the subscriber line 102, of the new switch 106.

Next, a board-to-board test unit (BTBTU) 108 is connected to standard no-test trunks (NTT) 109 and 110 each connected to the old switch 105 and the new switch 106 respectively. The both old and new switches have a basic capability to provide a metallic access pass from the BTBTU 108 to the subscriber line 102 through respective subscriber cards 104 and 107, metallic test access lines 111 and 112, and the NTTs 109 and 110.

The BTBTU108 has a data base of the analog subscriber's phone number whose line is to be tested, and sends the same subscriber number to both an old and new switches 105 and 106 (refer to SIG1 in FIG. 1).

If both the subscriber database of the new switch 106 is correct, and if the subscriber line 102 is correctly wired to the new switch 106 through the MDF 103, a metallic line loop is formed successfully from the BTBTU108 to the new switch 106 through the old switch 105 and the MDF 103 (refer to SIG2 in FIG. 1).

Then, the BTBTU108 sends a communication signal from the old switch 105 as one end of the loop, compares it with the communication signal turned around from the new switch 106 as the other end of the loop, thus performing a consistency test of the above described bridge.

Recently, digital subscriber line is used to secure the quality of voice communication and reduce the installation cost of subscriber line in such a case where a central office terminal is located apart from a subscriber.

That is, as shown in FIG. 2, a remote subscriber 201 is accommodated in a remote terminal (RT) 203 which forms a part of a digital loop carrier (DLC) through a subscriber line circuit (SLC) 202.

Communication signals and call control signals are transmitted between switches and the RT203 through standard PCM transmission facilities. If a switch is an analog type switch 208 as shown in FIG. 2, digitally multiplexed subscriber signals (referred to as a digital subscriber) is re-converted to an analog voice frequency signal (VF) by a central office terminal (COT), through digital cross connect (DSX) 205, located in the site where the analog switch 208 is located. Then, the re-converted analog voice signal VF is treated by the analog switch 208 as if the remote analog subscriber 202 is locally accommodated.

Thus, the digital loop carrier (DLC) for accommodating a digital subscriber in the analog switch through a COT as described above is referred to as "universal digital loop carrier (UDLC)."

On the other hand, recently, the digital switch has become more popular, replacing the conventional analog switch with a view to improving communication services. FIG. 3 shows an example of a configuration where the digital subscriber is accommodated in the digital switch.

A digital switch 301 handles voice data to/from the digital subscriber as the digital signal through a digital terminal (DT) 302. Thus, the DLC for accommodating a digital subscriber directly in the digital switch through the DT is referred to as "integrated digital loop carrier (IDLC)."

In the UDLC shown in FIG. 2, if the board-to-board test is conducted at the replacement of the analog switch with another analog switch, it is recommended that a metallic line path is formed in a COT206 (on the side of the switch) as shown in FIG. 1, and a physical loop should be formed by providing with a bridge in an MDF between two switches as shown in FIG. 1.

However, recently in most cases, a conventional analog switch is replaced with a new type digital switch. Therefore, the UDLC is converted, and accommodated in a new digital switch as an IDLC. In such cases, after the completion of replacement, the appearances of digital subscribers are in the time slots multiplexed on a PCM line, thus prohibiting the formation of a physical loop shown in FIG. 1. Therefore, in a board-to-board test described above, it should be determined whether or not a subscriber to be tested is logically allocated to a corresponding time slot in the PCM line in the correct way.

Therefore, in such a case, the conventional board-to-board test is not applicable, causing a problem that mis-engineering or mis-connection are often overlooked.

SUMMARY OF THE INVENTION

The present invention has been developed in the above described background with a view to conducting a board-to-board test for automatically checking the consistency of subscriber data and time slot allocation by digitally bridging between a new and an old switches without disturbing services to the digital subscriber.

The present invention relates to a board-to-board test unit for testing at the replacement of an old switch with a new switch whether the subscriber data stored in a new switch is consistent with the time slots on the PCM link assigned for the digital line, namely, the consistency between the subscriber data stored in the new switch and the central office wire pairs for allocation of the digital lines accommodated in the new switch.

First, a bridge part is provided for realizing a bridging function between the old switch and the new switch with a digital line operated and connected to both new and old switches.

Next, the test unit is provided for sending to both new and old switches the directory number of a digital subscriber to be tested.

Then, a test call control information monitor is provided in the new switch for monitoring according to the directory number of a subscriber received from a test controller, using a call control information extractor provided in the new switch as a standard component for extracting call control information from the PCM line accommodated in the new switch, whether or not the new switch receives call control information correctly from the old switch which also received the same number.

In the configuration described above, the old switch requires no special protocols used for a board-to-board test, but only has to perform a normal call process on receiving the directory number of a subscriber to be tested, thus reducing a process load.

A call control information extractor is provided in the new switch as a standard component, and a test call control information monitor can be easily realized by modifying programs for call processing in a normal switch.

As described above, the present invention permits conducting a board-to-board test on a PCM line, where a plurality of subscriber signals are multiplexed, by combining a calling function in the old switch and a standard function in the new switch of extracting call control information without excessively increasing the load of switches.

In this case, a bridge between the old switch and the new switch has to be provided only between the downstream digital line of an old switch and the upstream digital line of a new switch, thus monitoring the call control information on the PCM link without the operation of an old switch and the DLC.

As the directory number of a subscriber to be tested is sent from a test unit to both the old and new switches according to the inter-office interface using a normal inter-office trunk or an interface using an analog subscriber line, an additional interface is not required in the old and new switches for the board-to-board test, thus simplifying the communication procedure.

When the test unit receives from the old switch audible ringing tone (ART) notifying that the old switch is now ringing the digital subscriber to be tested via the DLC, the test unit notifies the old switch of the disconnection of the call to the subscriber to be tested, thus preventing the subscriber having the number to be tested from accidentally answering the test call. In response to the notification that the subscriber is busy, the test unit notifies both the old and new switches of the disconnection of the calling operation for the number of the subscriber to be tested.

BRIEF DESCRIPTION OF THE DRAWINGS

An object and feature of the present invention can be easily evaluated according to the attached drawings and the description of embodiments.

FIG. 6 shows a list for a reference of time slots in PCM24 links in the non-line-circuit mode to subscribers accommodated in an RT;

FIG. 7 shows a definition list of AB bits to be sent from a switch to an RT;

FIG. 8 shows a mapping list of subscribers accommodated in an RT and C field messages in the line-concentration mode;

FIG. 9A and 9B show a data link format;

FIG. 9C shows a mapping list of line numbers and C fields; and

EMBODIMENTS

Figure 4:
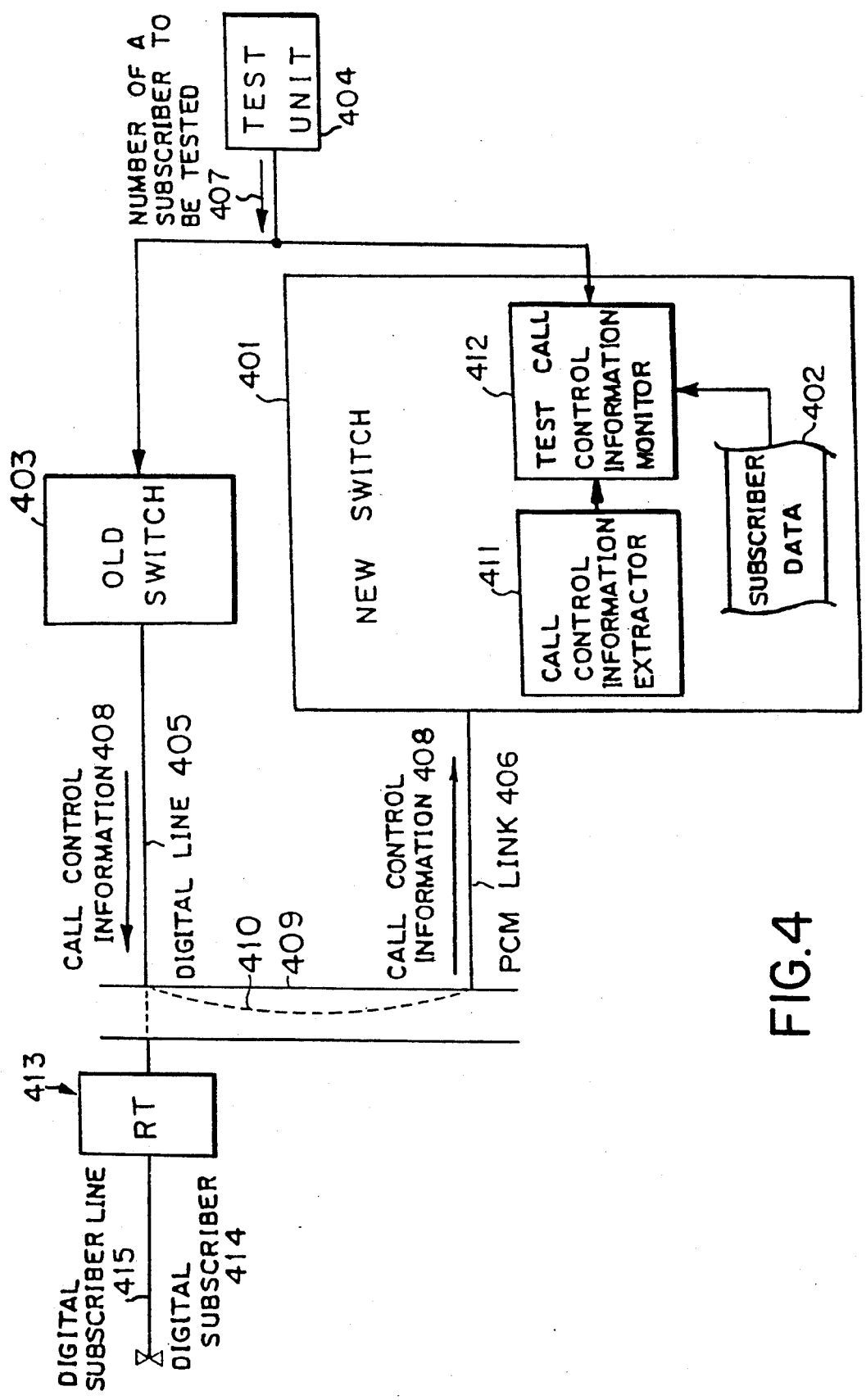
FIG. 4 shows a block diagram for explaining the principle of the present invention.

FIG. 4 shows a block diagram for explaining the principle of the present invention.

A board-to-board test unit in the present invention is designed in the following configuration.

First, as indicated in broken line 410, a PCM link 406 to be accommodated in a new switch 401 and a PCM link 405 to be accommodated in an old switch 403 are bridged as being in the normal operating condition.

Then, a test unit 404 sends the directory number of subscriber to be tested 407 to the old switch 403 and the new switch 401.

The new switch 401 determines according to subscriber data 402 stored in itself whether or not it successfully receives a call control information 408 for the subscriber to be tested 415 which is sent from the old switch 403 to the DLC 413 on receiving the number of a subscriber to be tested 407. As a result, the consistency of subscriber data 402 stored in the new switch 401 with physical and logical accommodation of the subscriber line 406 in the new switch 401 is verified.

In addition to the above described basic configuration, the present invention has unique characteristics as follows.

First, on each of PCM links 405 and 406, time slots conveying VF signals of a plurality of subscribers are multiplexed.

Then, a test call control information monitor 412 is provided for monitoring, using a call control information extractor 411 provided in the new switch 401 for extracting call control information from the PCM link 406, whether or not the new switch successfully receives from the old switch according to the subscriber data 402 call control information 408 corresponding to the number of a subscriber to be tested 407.

In the above described configuration, the PCM links 405 and 406 respectively comprise a pair of an upstream (a signal link run from the DLC to the switch) and a downstream (a signal link run from the switch to the DLC). The bridge shown in broken line in FIG. 4 is provided only between the downstream PCM link 405 in the old switch 403 and the upstream PCM link 406 in the new switch 401. The bridge 410 is applied on a digital cross connect 409 where the PCM links 405 and 406 are connected.

Next, the PCM links 405 and 406 conveys both speech signals and call control signals with a digital format. The call control information 408 is transmitted using, for example, AB bits. In this case, the call control information extractor 411 is a digital terminal for receiving AB bits as a SCN signal in the new switch 401. Otherwise, the call control information 408 is transmitted using, for example, on a data link included in the multiplexed signals on the PCM link 406. In this case, the call control information extractor 411 is a data link controller for receiving data link information as an SCN signal in the new switch 401.

Then, the directory number of a subscriber to be tested 407 is sent from the test unit 404 to the old switch 403 and the new switch 401 via an inter-office trunk interface or an analog subscriber line interface.

The test unit 404 sends the directory number of a subscriber to be tested 407 to the old switch 403 within the predetermined time after it sends the directory number of a subscriber to be tested 407 to the new switch 401.

The old switch 403 performs a normal sending-/receiving operation according to the directory number of a subscriber to be tested 407 received from the test unit 404. When the corresponding subscriber is busy, a busy tone (BT) is returned to the test unit 404. When the corresponding subscriber is not busy, the call control information 408 corresponding to the subscriber to be tested 407 is sent as a normal call to the digital subscriber line 415 while an audible ring tone (ART) is returned to the test unit 404. On receiving the notice ART from the old switch 403 that the subscriber is not busy, the test unit 404 notifies only the old switch 403 of the disconnection of the test call corresponding to the number of a subscriber to be tested 407. On receiving the notice from the old switch 403 that the subscriber is busy, the test unit 404 notifies both the new and old switches of the disconnection of the test call corresponding to the number of a subscriber 407.

The test call control information monitor 412 monitors whether or not the call control information 408 corresponding to the subscriber to be tested is received within a time period after the directory number of a subscriber to be tested is received from the test unit 404, and then notifies the test unit 404 of the monitoring result. The test unit 404 also monitors whether or not the notice of the monitoring result of the call control information 408 is given from the test call control information monitor 412.

In the above described configuration of the present invention, the call control information extractor 411 can use the same signal processing for extracting AB bits or data link information from the PCM link 406 in the normal system operation. The test call control information monitor 412 can be implemented as one of the functions of the processor, in the switch and monitors whether or not the call control information 408 corresponding to the call acceptance information equivalent to the subscriber data 402 stored in the test call control information monitor 412 is received normally. Therefore, a board-to-board test can be conducted on a digital subscriber line without excessively increasing the load of the new switch 401.

In this case, the bridge 410 between the old switch 403 and the new switch 401 can be provided only between the downstream PCM link 405 in the old switch 403 and the upstream PCM link 406 in the new switch 401. This is because, in the upstream and downstream PCM links, a subscriber is allocated to the same time slot, thus requiring the consistency check only in the upstream subscriber line as to whether a subscriber is allocated to a time slot properly. Therefore, call control information, etc. is protected from being sent from the new switch 401 to the old switch 403 or the DLC in order not to disturb the operation of the old switch 403 in the board-to-board test.

The directory number of a subscriber to be tested 407 is sent from the test unit 404 to the old switch 403 and the new switch 401 via a common inter-office trunk or analog subscriber line. That is, an additional interface is not required for a board-to-board test between the old and new switches 403 and 401 and the test unit 404, thus simplifying the communication procedure.

The old switch 403 sends the call control information 408 corresponding to the directory number of a subscriber to be tested 407 as a normal call to the PCM link 405 accommodated in the old switch 403. On receiving normal call response information from the old switch that the subscriber corresponding to the number of a subscriber to be tested is busy or not busy, the old switch 403 notifies the test unit 404 of the result. That is, in the old switch 403, a special protocol is not required at all for a board-to-board test, thus reducing a process load. In this case, on receiving the notice that the subscriber is not busy, the test unit 404 notifies only the old switch 403 of the disconnection of the test call corresponding to the number of a subscriber to be tested 407, thus preventing the subscriber from accidentally answering the test call.

Detailed explanation of embodiment of the present invention is given according to the above described principle.

Figure 5:
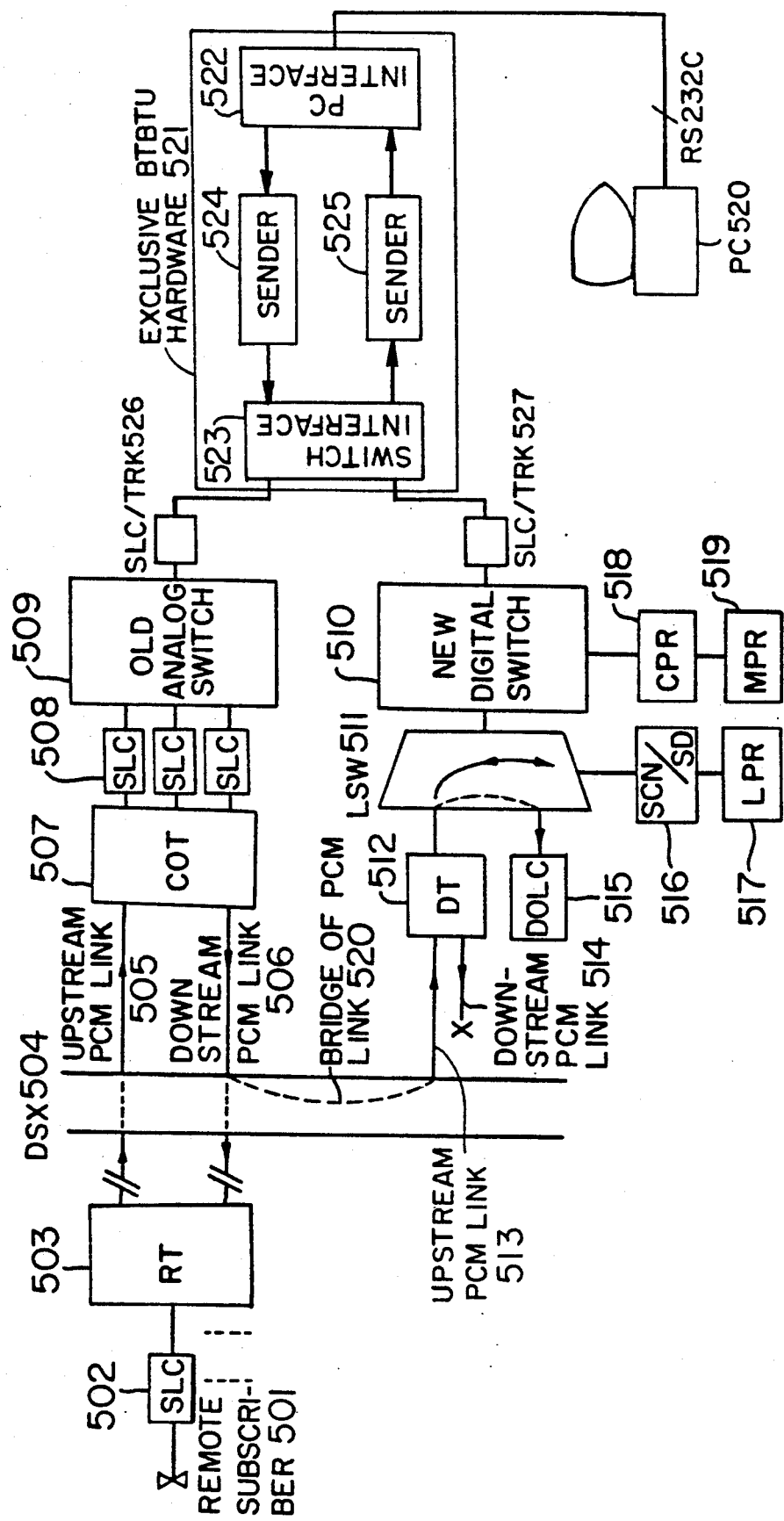
FIG. 5 shows a system configuration of an embodiment of the present invention.

FIG. 5 shows a system configuration of an embodiment during a board-to-board test. The embodiment is used in the board-to-board test where the old analog switch is replaced with the new digital switch, that is, a UDLC (universal digital loop carrier) is converted to an IDLC (integrated digital loop carrier).

In FIG. 5, the UDLC is to be replaced. That is, a remote subscriber 501 is accommodated in a remote terminal (RT) 503 through a subscriber line circuit (SLC) 501. Then, a communication signal and call control signal between the switch and the RT are sent through an upstream PCM link 505 and a downstream PCM link 506. In a central office terminal (COT) 507, digital subscribers are converted interchangeably to and from an analog voice signal through an intrastation digital cross connect (DSX) 504, and then accommodated as an analog subscriber in the old analog switch 509 through the SLC 508.

On the other hand, in the new digital switch 510, after accommodated in a digital terminal (DT) 512 forming a part of a line concentrator (LC), an upstream PCM link 513 and a downstream PCM link 514 are formed of a line circuit by a line switch (LSW) 511 also forming a part of an LC, and then connected to the new digital switch 510 forming a distributor. A digital data link controller (DDLC) 515 is connected to the LSW 511. A control signal to be inputted/outputted through the DT 512 and the DDLC 515 is processed by a line processor (LPR) 517 through a scanner/signal distributor (SCN/SD) 516. A call processor (CPR) 518 controls the new digital switch 510 to control processing and switching operation by receiving/sending subscriber data to and from a main processor (MPR) 519, and communicating with the LPR 517 through a link (not shown in FIG. 5). These operations are described later.

When a board-to-board test is conducted at the replacement of a switch, a new digital switch 510 is bridged with an IDLC.

In this case, only an upstream PCM link 513 accommodated in the DT 512 is bridged as shown in broken line 515 to a downstream PCM link 506 running through the DSX504 to the RT503 through the old analog switch 509 because:

a main purpose of the board-to-board test on a digital subscriber is not only to check whether or not the correct PCM links are physically associated in the proper manner in the DSX 504, but to check the consistency as to whether or not subscriber data stored in the new digital switch 510 are allocated properly to the corresponding time slot in each PCM link. A subscriber is allocated to the same time slot in the upstream PCM link 513 and the downstream PCM link 514. Therefore, the consistency check should be made only in the upstream PCM link 513 as to whether a subscriber is properly allocated to a time slot, requiring no checks in the downstream PCM link 514.

Thus, the downstream PCM link 514 accommodated in the DT 512 is not bridged, or a signal is not sent from the new digital switch 510 to the old analog switch 509 and the RT 503. Therefore, a board-to-board test does not disturb services of the UDLC in operation. After the completion of a board-to-board test, the connection must be switched properly and instantaneously from the upstream PCM links 505 to 513 and from the downstream PCM links 506 to 514 in the DSX504.

Then, in a board-to-board test, a test unit comprising a personal computer system (PC) 520 and an exclusive BTBTU hardware 521 is connected to the old analog switch 509 and the new digital switch 510.

The PC520 controls the test using a data base of subscriber numbers.

The exclusive BTBTU hardware 521 sends a control signal to the switch and receives/analyzes a signal from the switch.

The data base of subscriber directory numbers are generated based on the data base of subscriber numbers used in the old analog switch 509, and installed in the PC520 using a floppy diskette.

The PC520 and the exclusive BTBTU hardware 521 are connected by an RS232C interface 522.

Figure 1:
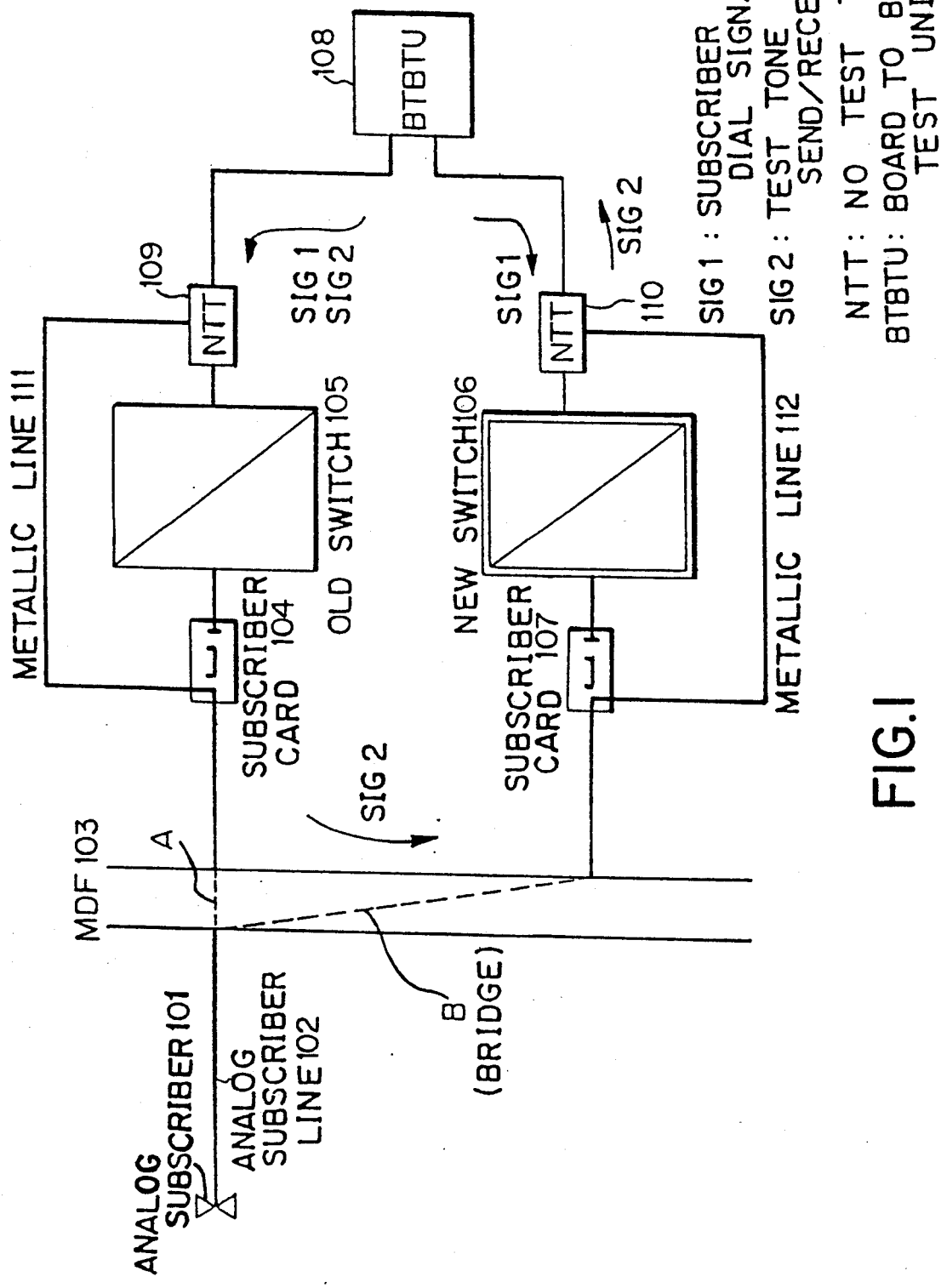
FIG. 1 shows a configuration of a board-to-board test unit in the prior art technology.
Figure 2:
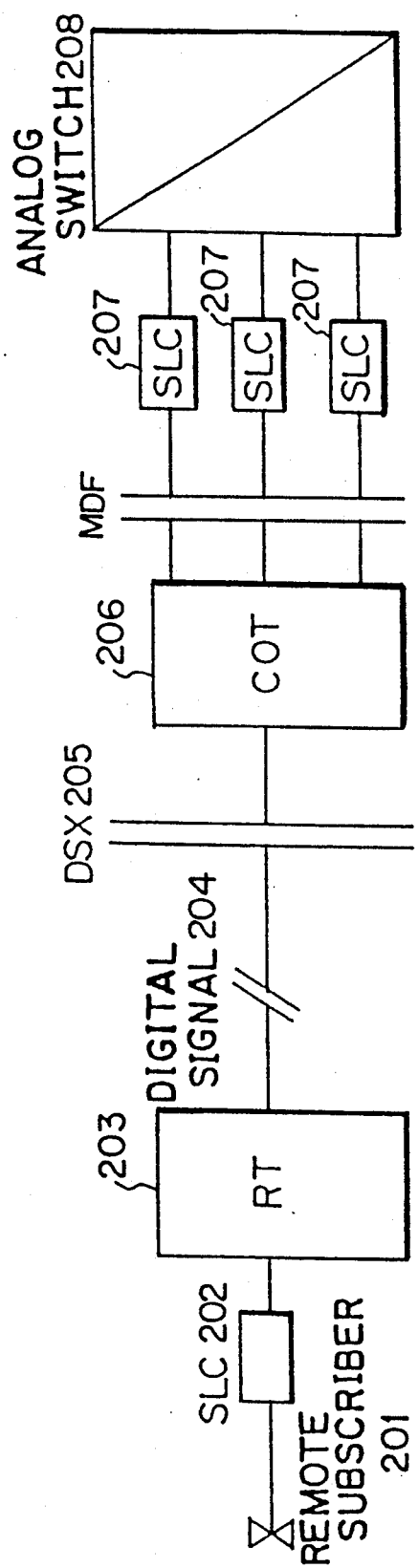
FIG. 2 shows a system configuration of a Universal Digital Loop Carrier (UDLC)
Figure 3:
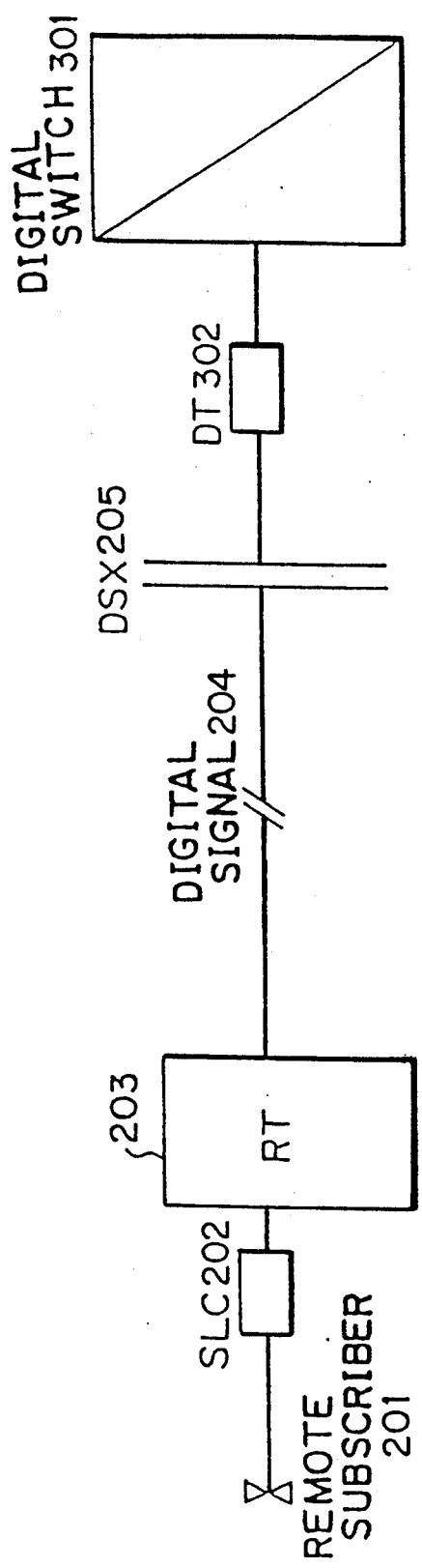
FIG. 3 shows a system configuration of an Integrated Digital Loop Carrier (IDLC)

The existing test trunk interface 109 and 110 in FIG. 1 for the BTB test of analog lines can not be used for the BTB test of digital lines. Therefore, the BTBTU interfaces with both the old and the new switches via a common inter-office trunks (SLC/TRK) 526, 527, or an analog subscriber line. The switch interface 523 serves as an interface circuit. A sender 524 is a sending circuit for sending a control signal to a switch; and a receiver is a receiving circuit for receiving a signal from a switch.

Using the above described interface between the test unit and the switch, the old analog switch 509 only has to perform a normal call process in a board-to-board test as explained later.

When a board-to-board test is conducted in this system configuration, a subscriber number is sent to the new and old switches 509 and 510 as in a normal call processing operation through the PC 520 and the exclusive BTBTU hardware 521.

The old analog switch 509 performs a normal call termination process for the above described subscriber number, and applies ringing on the analog line between the SLC and the COT corresponding to the remote subscriber to be tested. The COT 207 converts the ringing to an alert signal and transits it on the downstream PCM link 506 to the RT 503.

On the other hand, the new digital switch 510 receives from the upstream PCM link 513 the alert signal transmitted on the downstream PCM link 506, and then runs a test protocol described later.

To normally receive such call control information, a new digital switch must be provided with an interface in the PCM link using the IDLC. Then, detailed explanation is given about an example of this interface before given about practical procedure of a board-to-board test. An interface for the IDLC is the same as that between the COT507 and the RT503 in FIG. 5.

In an embodiment shown in FIG. 5, the PCM links 505, 506, 513, 513, etc. respectively have a configuration comprising 1-4 physically-grouped links each being called a PCM 24 link having the following format.

A PCM 24 link has a format of digital data transmission with a transmission speed of 1544 kb/s (kilobits/second). It multiplexes 24 channels. A time slot in each channel permits transmitting, in real time, digital voice data sampled at 8 kHz and quantized in 8 bits, that is 64 kb/s data transmission.

There are two kinds of an IDLC interface based on the above described PCM 24 links: a non-line-concentration mode interface and a 2:1 line-concentration mode interface. The present embodiment can be applicable to both of them.

The non-line-concentration mode is explained first as follows:

In the non-line-concentration mode, channels each having a transmission speed of 64 kb/s in the PCM link are associated fixedly with each of remote subscribers 501 accommodated in the RT 503. For example, in an example shown in FIG. 6, each PCM link in FIG. 5 comprises four physical PCM 24 links A-D each accommodating 1-24 channels, and these four PCM 24 links can be assigned a total of 96 logical subscriber numbers.

In such a non-line-concentration mode, the least significant one bit in 8-bit voice data is used as a signal bit at the rate of two time slots per 12 time slots. In FIG. 5, the state of AB bits, which is sent from the COT507 connected to the old analog switch 509 to the RT503, implies the meaning shown in FIG. 7, for example, depending on the type of channel unit (corresponding to the RT 503).

In the non-line-concentration mode, according to the above described rules, call control information such as on-hook and off-hook information, etc. are transmitted in each of 1-24 channels in the digital subscriber line. For example, in the old analog switch 509, if a call is accepted at a subscriber 4, AB bits in the time slot of the seventh channel in the link A among four links A-D shown in FIG. 6 forming an upstream PCM link 505 in FIG. 5 are used to transmit off-hook information to the RT 503.

Then, in the non-line-concentration mode, a board-to-board test can be conducted by receiving, on the side of the DT512 in the new digital switch 510 shown in FIG. 5, a call acceptance information as an SCN signal using the above described AB bits sent from the old analog switch 509.

Next, the 2:1 line-concentration mode is explained. In this mode, considering that all channels are not constantly used, two times the total number of channels (time slots) available in the PCM link can be set as the directory number of subscribers. That is, in this mode, when a calling or call-accepting process is performed, the calling is allocated dynamically to an idle channel.

In this case, information called line numbers 0–47 is assigned to one PCM 24 link as shown in FIG. 8. Simultaneously, up to 24 line numbers are allocated to up to 24 idle time slots. For 96 subscribers, for example, two PCM 24 links A and C are used as PCM links shown in FIG. 5, and the line numbers of each link are associated with each of subscriber directly numbers as shown in FIG. 8. Each call control unit (for example, the analog switch 509 and the RT503 in FIG. 5) allocates subscribers to idle time slots according to the correspondence shown in FIG. 8.

That is, in FIG. 5, when a call accepting process is performed for a subscriber 4 accommodated in the old analog switch 509, the old analog switch 509 transmits information of line number 12 (FIG. 8) to the RT503 in the link A in two links forming the upstream PCM link 505. Thus, the RT503 allocates a subscriber 4 to an idle time slot.

In this case, in each of PCM 24 links, the information of the above described line number is transmitted as follows.

In each of the PCM 24 links, each frame comprising 24 channels as one unit is added a one-bit signal bit in addition to (8 bits × 24 channels) information bits. Using this one-bit signal bit for one frame, various control information is transmitted as digital data link (DDL) information, where a plurality of frames (referred to as a multi-frame) having the time length of 9ms is defined as one unit. FIG. 9A shows DDL information to be transmitted in 1 multi-frame.

Using C field information represented in 12 bits C1–C11 among various DDL information shown in FIG. 9A, the above described line number information is transmitted. A C field and a line number are associated with each other as shown in FIG. 9B to permit transmitting information of a plurality of line numbers at one time in one multi-frame.

First, one of the line groups 1–6 is specified by a binary number comprising 3 bits C1, C2, and C3. Then, each line number shown in FIG. 9B is specified in each of specified line groups by selectively activating ("1", for example) each bit of C4–C11. For example, when line group 1 is specified by 3 bits C1, C2, and C3, line numbers 4 and 8 are specified simultaneously if bits C6 and C10 are activated.

A transmission protocol shown in FIGS. 9A, 9B and 9C permit transmitting information of up to 6 line numbers in the same line group shown in FIG. 9B simultaneously per multi-frame having the time length of 9ms.

After each of subscribers is allocated to a specific free time slot according to the information of line numbers transmitted as described above, a calling operation is monitored using AB bits as in the non-line-concentration mode.

In an embodiment shown in FIG. 5, if the above described 2:1 line concentration mode is adopted, a DLC515 and a DT512 receive, as described later, the DDL information sent from the old analog switch 509 and call acceptance information comprising AB bits as an SCN signal, thus conducting a board-to-board test.

Next, call acceptance information transmitted through a PCM link in the data format shown in FIGS. 6–9B is received by the DT512 and the DDLC515 shown in FIG. 5. This configuration is explained in association with FIG. 10.

Figure 10:
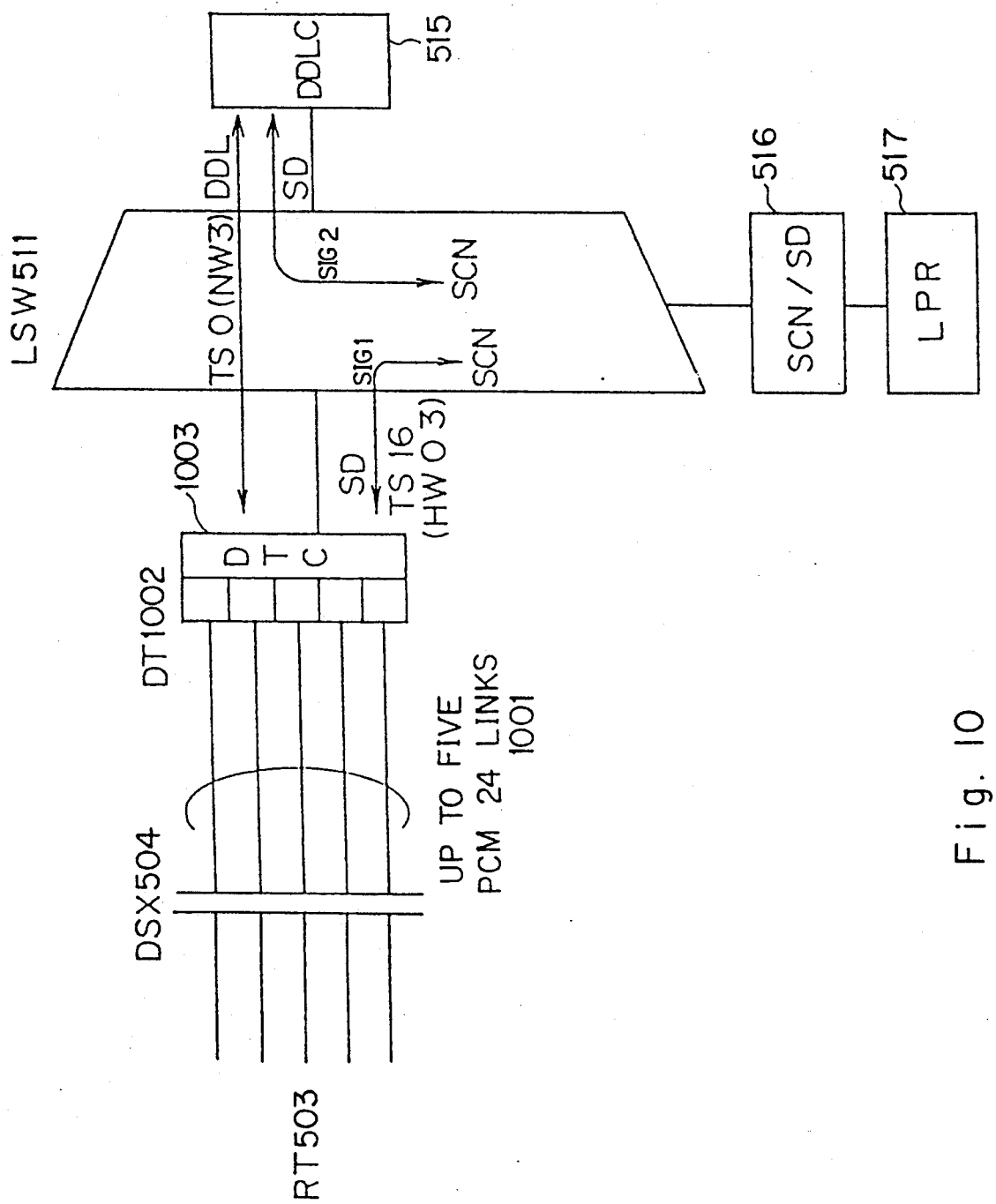
FIG. 10 shows a path of a call control signal in the line circuit of a new digital switch.

The DT512 shown in FIG. 5, and in FIG. 10 for a more detailed drawing, comprises ST1002 and a digital terminal controller (DTC) 1003 for controlling them collectively. The upstream PCM link 513 accommodated in the DT1512 shown in FIG. 5, and in FIG. 10 for a more detailed drawing, comprises up to 5 PCM 24 links 1001 and is accommodated in a plurality of DT1002 provided individually.

After converted in the DTC1003 to an SCN signal specific to a switch, AB bits applied by each of PCM 24 line 1001 (in the non-line concentration mode and after the allocation of time slots in the line-concentration mode) are transmitted to an SCN/SD516 and accepted therein using the 16th time slot TS16 in a highway corresponding to the above described PCM24 link 1001 among 4 highways HW0–HW3 in a switch (refer to the path shown by SIG1 in FIG. 10).

On the other hand, DDL information (when time slots are allocated in the line-concentration mode) is transmitted using the 0th time slot TS0 of the highway HW3 in a line concentration LSW511, accepted by the DDLC515, converted to an SCN signal specific to a switch, and then received by an SCN/SD516 (refer to the path shown by SIG2 in FIG. 10).

Then, an LPR517 has the SCN memory (not shown in FIG. 10) where an SCN signal received by the SCN/SD516 is stored and transmits the change of the state of an SCN memory to a CPR518 shown in FIG. 5 through a link (not shown in FIG. 10) by monitoring the content of the memory periodically. Though not associated with the present invention specifically, call control information, etc. applied by the CPR518 is converted to a signal distribution (SD) signal by the LPR517, and then sent from the SCN/SD516 to the downstream PCM link 514 (FIG. 5) in AB bits or as DDL information through the inverse path of the above described path.

A practical procedure of a board-to-board test which is conducted according to the basic operation of the above described new digital switch 510 (including LSW511, DT512, and DDLC515) is explained as follows:

An object of a board-to-board test is to check whether or not right PCM links are physically connected in the proper manner, and to check the consistency as to whether subscriber data accommodated in an MPR519 in the new digital switch 510 are properly allocated to a corresponding time slot in each of PCM links.

Step 1: First, a PC520 sends the directory number of a subscriber to be tested to the digital switch 510 through an exclusive BTBTU hardware 521, and then send the subscriber directory number to the old analog switch 509 after a predetermined time period. This timing permits the new digital switch 510 to monitor without delay the call acceptance information from the old analog switch 509. In this case, an interface between each switch and the exclusive BTBTU hardware 521 can be a commonly used inter-station trunk or an analog subscriber line, and no additional calling operation is required at all.

Step 2: In the new digital switch 510, the number of a subscriber received by the MPR519 is analyzed; the location of the accommodation of the subscriber is determined according to subscriber data stored in the MPR519; and the result is given to the corresponding LPR517 of the LSW511 through the CPR518. The LPR517 starts monitoring an SCN signal in its internal SCN memory.

Step 3: The old analog switch 509 performs a normal call accepting process according to the subscriber data received from the exclusive BTBTU hardware 521.

Step 4: When a remote subscriber 501 to be tested is not busy, the old analog switch 509 sends call acceptance information to the downstream PCM link 506 using AB bits in the non-line-concentration mode and using DDL information and AB bits in the 2:1 line-concentration mode. Then, the old analog switch 509 returns an audible ring tone (ART) for notifying the exclusive BTBTU hardware 521 of the ringing state as in a normal call accepting process.

Step 5: After detecting the above described ART through the exclusive BTBTU hardware 521, the PC520 disconnects a call to the old analog switch 509, thus preventing the remote subscriber 501 from accidentally answering a test call.

Step 6: The line concentration of the new digital switch 510 receives call acceptance information transmitted from the old analog switch 509 through the downstream PCM link 506, DSX504, and the upstream PCM link 513 according to the process sequence of the previous step 3.

That is, in the non-line-concentration mode, AB bits in a channel are converted to an SCN signal in the DTC1003 forming a part of the DT512 as described above (refer to FIG. 10), and stored periodically in an SCN memory in the LPR517 through the SCN/SD516. As a result, the state of the SCN memory changes, and the acceptance of a call at the above described channel is notified.

In the 2:1 line-concentration mode, DDL information is converted to an SCN signal by the DDLC515 as described above, and then stored periodically in an SCN memory in the LPR517 through the SCN/SD516. As a result, the state of the SCN memory changes, and the completion of the allocation of a time slot is notified. Then, AB bits are stored as an SCN signal in the SCN memory, and thus the call acceptance by the change of the state is notified.

Step 7: After detecting the change of the state corresponding to the call acceptance at a channel of the subscriber to be tested, the LPR517 notifies the CPR518 of it.

Step 8: The CPR518 notifies the PC520 of the test result through the exclusive BTBTU hardware 521. In this case, the notice can be made by a simple disconnection from the new digital switch 510, or by an MF signal or a DTMF signal using a tone generator to notify the test result without fail and in detail.

Step 9: After the new digital switch 510 notifies the exclusive BTBTU hardware 521 of a test result, the PC520 disconnects the test call through the exclusive BTBTU hardware 521, and then proceeds to the next test step on a subscriber.

The process sequence of the above described steps 1-9 is a sequence where a test is conducted successfully. The following steps 10 and 11 show a sequence where a test fails.

Step 10: In the process sequence of the preceding step 4, when the remote subscriber to be tested 501 is busy, a busy tone (BT) is returned to the exclusive BTBTU hardware 521 as in a normal call accepting process. In response to this, in the process sequence of the preceding step 5, the PC520 disconnects the call to the old analog switch 509 and the new digital switch 510, thus terminating the test on the subscriber after notifying that the subscriber is busy.

Step 11: In the process sequence of the preceding step 7, if a subscriber to be tested is allocated to a different time slot and the change of the SCN state of the subscriber cannot be detected due to an erroneous setting of subscriber data or station data by the new digital switch 510, the CPR518 notifies the exclusive BTBTU hardware 521 of the unsuccessful termination of the test at an appropriate interval by an internal timer (not shown in drawings). The PC520 also keeps an interval by a timer individually, and if it does not receive any notice from the new digital switch 510 within a predetermined time period, the call is disconnected and the test on the subscriber is terminated after a notice that a setting is not correct.

In the above described embodiment, the old switch is an analog switch. However, the present invention is applicable to the case where an old switch is a digital switch as long as an IDLC is adopted in a new system to accommodate digital subscribers, because call acceptance information is transmitted in the PCM link in AB bits or using DDL information, etc.

What is claimed is:

1. A board-to-board test unit for a digital subscriber line for checking, at the replacement of an old switch with a new switch, the consistency of subscriber data stored in said new switch and of the allocation of said subscriber data to a PCM link accommodated in said new switch, said test unit comprising:

a bridging means for bridging the PCM link accommodated in said new switch and a PCM link accommodated in said old switch in the normal operating condition;

a test unit for sending the directory number of a subscriber to be tested to said old switch and said new switch;

a test call control information monitoring means for monitoring, according to said directory number of a subscriber to be tested, whether or not call control information sent by said old switch which receives said directory number of a subscriber to be tested is normally received by said new switch; and a call control information extracting means provided in said new switch as a standard component for extracting call control information from said PCM link accommodated in said new switch.

2. A board-to-board test unit for a digital subscriber line according to claim 1, wherein
a plurality of subscribers are multiplexed in physical links in said PCM link.

3. A board-to-board test unit for a digital subscriber line according to claim 1, wherein
said bridging means is a digital distribution frame for distributing each of said digital lines.

4. A board-to-board test unit for a digital subscriber line according to claim 1, wherein said PCM link is a PCM multiplexed line.

5. A board-to-board test unit for a digital subscriber line according to claim 4, wherein
said call control information is transmitted using AB bits; and
said call control information extracting means is a digital terminal for receiving said AB bits as an SCN signal in the line circuit in said new switch.

6. A board to-board test unit for a digital subscriber line according to claim 4, wherein
said call control information is transmitted using data link information; and
said call control information extracting means is a data line control unit for receiving said data link information as an SCN signal in said new switch.

7. A board-to-board test unit for a digital subscriber line according to claim 1, wherein
said directory number of a subscriber to be tested is sent from said test unit to said old switch and said new switch according to an inter-station interface using an inter-station trunk.

8. A board-to-board test unit for a digital subscriber line according to claim 1, wherein
said directory number of a subscriber to be tested is sent from said test unit to said old switch and said new switch according to an interface using an analog subscriber line.

9. A board-to-board test unit for a digital subscriber line according to claim 2, wherein
said test unit sends said directory number of a subscriber to be tested to said old switch at a predetermined interval after sending to said new switch said number of a subscriber to be tested.

10. A board-to-board test unit for a digital subscriber line according to claim 1, wherein
said old switch sends to said PCM link accommodated in itself said call control information corresponding to said directory number of a subscriber to be tested as a normal call process;
said old switch, on receiving from said PCM link accommodated in itself normal call response information indicating that the subscriber having said directory number of a subscriber to be tested is not busy after sending said call control information, notifies said test unit of said information as a normal call process; and
said test unit, on receiving said notice, notifies said old switch of the disconnection of the call to said directory number of a subscriber to be tested.

11. A board-to-board test unit for a digital subscriber line according to claim 1, wherein
said old switch sends to said PCM link accommodated in itself said call control information corresponding to said directory number of a subscriber to be tested as a normal call process;
said old switch, on receiving from said PCM link accommodated in itself normal call response information indicating that the subscriber having said directory number of a subscriber to be tested is busy after sending said call control information, notifies said test unit of said information as a normal call process; and
said test unit, on receiving said notice, notifies said old switch and said new switch of the disconnection of the call to said number of a subscriber to be tested.

12. A board-to-board test unit for a digital subscriber line according to claim 1, wherein
said test call control information monitoring means monitors whether or not call control information corresponding to said directory number of a subscriber to be tested is received within a predetermined time period after receiving said directory number of a subscriber to be tested from said test unit, and then notifies said test unit of the monitoring result.

13. A board-to-board test unit for a digital subscriber line according to claim 1, wherein
said bridging means provides a bridge, in the normal operating condition, between the PCM link accommodated in said old switch for connecting said old switch and a subscriber and the PCM link accommodated in said new switch for connecting a subscriber and said new switch.

* * * * *